(12) United States Patent
Moorhead et al.

(10) Patent No.: US 9,450,426 B2
(45) Date of Patent: Sep. 20, 2016

(54) METHOD FOR OPPORTUNISTICALLY BALANCING CHARGE BETWEEN BATTERY CELLS

(75) Inventors: Brian C. Moorhead, Willis, MI (US); Brian D. Rutkowski, Ypsilanti, MI (US)

(73) Assignee: A123 Systems LLC, Waltham, MA (US)

( * ) Notice: Subject to any disclaimer, the term of this patent is extended or adjusted under 35 U.S.C. 154(b) by 193 days.

(21) Appl. No.: 14/003,051

(22) PCT Filed: Mar. 7, 2012

(86) PCT No.: PCT/US2012/028039
§ 371 (c)(1),
(2), (4) Date: Nov. 6, 2013

(87) PCT Pub. No.: WO2012/122250
PCT Pub. Date: Sep. 13, 2012

(65) Prior Publication Data
US 2014/0049222 A1 Feb. 20, 2014

Related U.S. Application Data

(60) Provisional application No. 61/449,804, filed on Mar. 7, 2011.

(51) Int. Cl.
*H02J 7/00* (2006.01)
*H01M 10/44* (2006.01)

(52) U.S. Cl.
CPC .............. *H02J 7/00* (2013.01); *H01M 10/441* (2013.01); *H02J 7/0016* (2013.01)

(58) Field of Classification Search
CPC ........ H02J 7/0014; H02J 7/00; H02J 7/0013; H02J 7/0016; H01M 10/441; H01M 10/4207; H01M 2010/4271; H01M 10/48; H01M 10/482; H01M 10/488; Y02T 10/7044; Y02T 10/7066
USPC .................. 320/116, 117, 107, 118, 134, 160
See application file for complete search history.

(56) References Cited

U.S. PATENT DOCUMENTS 4,396,880 A * 8/1983 Windebank ........... H01M 10/44
320/156
6,040,685 A * 3/2000 Tsenter ................. H02J 7/0086
320/139

(Continued)

FOREIGN PATENT DOCUMENTS

JP 10191574 A 7/1998
JP 2007325451 A 12/2007

OTHER PUBLICATIONS

ISA Korea, International Search Report and Written Opinion of PCT/US2012/028039, WIPO, May 31, 2012, 10 pages.

*Primary Examiner* — Helen Rossoshek
(74) *Attorney, Agent, or Firm* — Alleman Hall McCoy Russell & Tuttle LLP (57) ABSTRACT

Systems and methods for balancing battery cells of a battery pack are disclosed. In one example, a charge imbalance is determined while battery cells operate in a high charge resolution voltage range. The charge imbalance determined during operation in the high charge resolution voltage range may be removed when the battery cells are operated in a low charge resolution voltage range. The system and method may be particularly useful for balancing battery cells that operate in the low charge resolution voltage range for a large portion of their operating time.

10 Claims, 8 Drawing Sheets

(56) References Cited

U.S. PATENT DOCUMENTS

| | | | | |
|---|---|---|---|---|
| 6,621,250 | B1* | 9/2003 | Ohkubo | G01R 31/3613 320/136 |
| 7,378,818 | B2* | 5/2008 | Fowler | B60L 11/185 320/108 |
| 7,723,955 | B2* | 5/2010 | Zaag | H02J 7/0019 320/109 |
| 8,143,851 | B2* | 3/2012 | Greening | G06F 1/189 320/116 |
| 8,207,740 | B2* | 6/2012 | Lin | H01M 10/441 180/207.3 |
| 8,330,417 | B2* | 12/2012 | Athas | G06F 1/189 320/117 |
| 8,541,979 | B2* | 9/2013 | Firehammer | H02J 7/0014 320/107 |
| 8,866,444 | B2* | 10/2014 | Stewart | G01R 31/025 320/134 |
| 8,886,478 | B2* | 11/2014 | Fink | H02J 7/1446 320/125 |
| 2003/0222619 | A1 | 12/2003 | Formenti et al. | |
| 2004/0128086 | A1* | 7/2004 | Barsoukov | G01R 31/3651 702/63 |
| 2005/0035743 | A1* | 2/2005 | Kawakami | G01R 31/3662 320/162 |
| 2008/0018300 | A1* | 1/2008 | Zaag | H02J 7/0019 320/118 |
| 2009/0088994 | A1* | 4/2009 | Machiyama | B60L 11/1861 702/63 |
| 2009/0197158 | A1* | 8/2009 | Ogawa | H01M 2/1653 429/144 |
| 2010/0247988 | A1 | 9/2010 | Okumura et al. | |
| 2010/0277123 | A1* | 11/2010 | Lim | H02J 7/0016 320/116 |
| 2011/0001352 | A1* | 1/2011 | Tamura | B60R 16/033 307/9.1 |
| 2011/0003182 | A1* | 1/2011 | Zhu | H01M 10/482 429/50 |
| 2011/0006737 | A1* | 1/2011 | Saligram | H02J 7/0078 320/134 |
| 2011/0309796 | A1* | 12/2011 | Firehammer | H02J 7/0018 320/118 |
| 2011/0309799 | A1* | 12/2011 | Firehammer | H02J 7/0014 320/134 |
| 2013/0249490 | A1* | 9/2013 | Umemoto | H02J 7/0021 320/118 |
| 2013/0271068 | A1* | 10/2013 | Komoda | H01M 10/482 320/107 |
| 2014/0015483 | A1* | 1/2014 | Tagaya | B60L 11/1809 320/109 |
| 2014/0042980 | A1* | 2/2014 | Floros | H02J 7/0016 320/134 |
| 2014/0167685 | A1* | 6/2014 | Tang | H02J 7/0014 320/107 |
| 2014/0167706 | A1* | 6/2014 | Sun | H02J 7/0083 320/160 |
| 2014/0217982 | A1* | 8/2014 | Ohkawa | H02J 7/0016 320/118 |
| 2014/0225622 | A1* | 8/2014 | Kudo | B60L 3/0046 324/433 |
| 2014/0285151 | A1* | 9/2014 | Steck | H02J 7/0016 320/116 |
| 2014/0285152 | A1* | 9/2014 | Becker | H02J 7/0014 320/118 |
| 2014/0327407 | A1* | 11/2014 | Lucea | B60L 11/1866 320/134 |
| 2014/0349146 | A1* | 11/2014 | Dittmann | H02J 7/0016 429/50 |
| 2015/0270731 | A1* | 9/2015 | Adelmann | H02J 7/35 320/101 |
| 2016/0001673 | A1* | 1/2016 | Smidebrant | H02J 7/0016 320/118 |

* cited by examiner

METHOD FOR OPPORTUNISTICALLY BALANCING CHARGE BETWEEN BATTERY CELLS

CROSS REFERENCE TO RELATED APPLICATIONS

This application claims priority from International Patent Application Serial No. PCT/US2012/028039, filed Mar. 7, 2012 and entitled METHOD FOR OPPORTUNISTICALLY BALANCING CHARGE BETWEEN BATTERY CELLS, which claims priority to U.S. Provisional Patent Application Ser. No. 61/449,804, filed Mar. 7, 2011 and entitled METHOD FOR OPORTUNISTICALLY BALANCING CHARGE BETWEEN BATTERY CELL, the entirety of both which are hereby incorporated herein by reference for all intents and purposes.

TECHNICAL FIELD

The present description relates to balancing charge between battery cells of a battery pack. In one example, charge of battery cells is opportunistically balanced in response to battery cell output voltage.

BACKGROUND AND SUMMARY

Battery packs may be configured from a plurality of battery cells. Adding battery cells in series can increase battery pack voltage while adding battery cells in parallel can increase the amp-hour rating of a battery pack. However, the amounts of charge stored in series battery cells can vary do to manufacturing variation. If the charge of battery cells is allowed to vary from battery cell to battery cell, it is possible that less than the total capacity of the battery pack is available to a battery pack load. For example, if one battery cell stores more charge than another battery cell, charging and discharging of the battery cell may be dictated by the lower capacity battery cell since it is likely to reach a battery cell voltage limit sooner than a higher capacity battery cell during battery cell charging or discharging.

Lithium-ion battery cells offer the capability of storing relatively large amounts of charge in a small package. However, lithium-ion battery cells have an open circuit voltage profile that can make it difficult to determine when it is desirable to balance charge between battery cells. Further, the open circuit voltage profile of lithium-ion battery cells can make it difficult to determine how much charge is drained or added to a battery cell when the battery cell open circuit voltage is used to determine when battery cells are out of charge balance.

The inventors herein have recognized the above issues and developed an approach to address them. Specifically, the inventors have developed a method for balancing charge between battery cells, comprising: sampling an amount of charge stored in first battery cell and a second battery cell at first time; sinking or sourcing an amount of charge from the first battery cell and the second battery cell after sampling the amount of charge stored in the first battery cell and the second battery cell; and balancing of charge of a first battery cell or a second battery cell after sinking or sourcing the amount of charge from the first battery cell and the second battery cell in an amount of charge related to a difference between the amount of charge stored in the first battery cell and the amount of charge stored in the second battery cell at the first time.

By determining whether or not a charge imbalance between battery cells is present at a first time when determining charge of a battery cell may be more reliable, and balancing charge at a second time when determining charge of a battery cell may be less reliable, charge between cells may be balanced more accurately so that more charge capacity of the battery may be used. For example, at lower battery voltages, it may be possible to more accurately determine a difference in charge between battery cells since battery voltage changes at a higher rate with respect to battery charge than for middle range battery voltages. However, it may be undesirable to balance charge between battery cells at lower voltages because some battery cells may be at lower voltage limits. But, after the battery cells have been charged, a difference in charge determined at a lower level of battery charge may be used at a higher level of battery charge so that charge may be removed or added to battery cells without pushing the battery cells into charging or discharging limits.

The present description may provide several advantages. Specifically, the approach may improve battery cell charge balancing by providing improved estimates of charge to be added or removed from battery cells. In addition, the approach provides for accurate charge balancing without the cost of high resolution voltage measurements.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
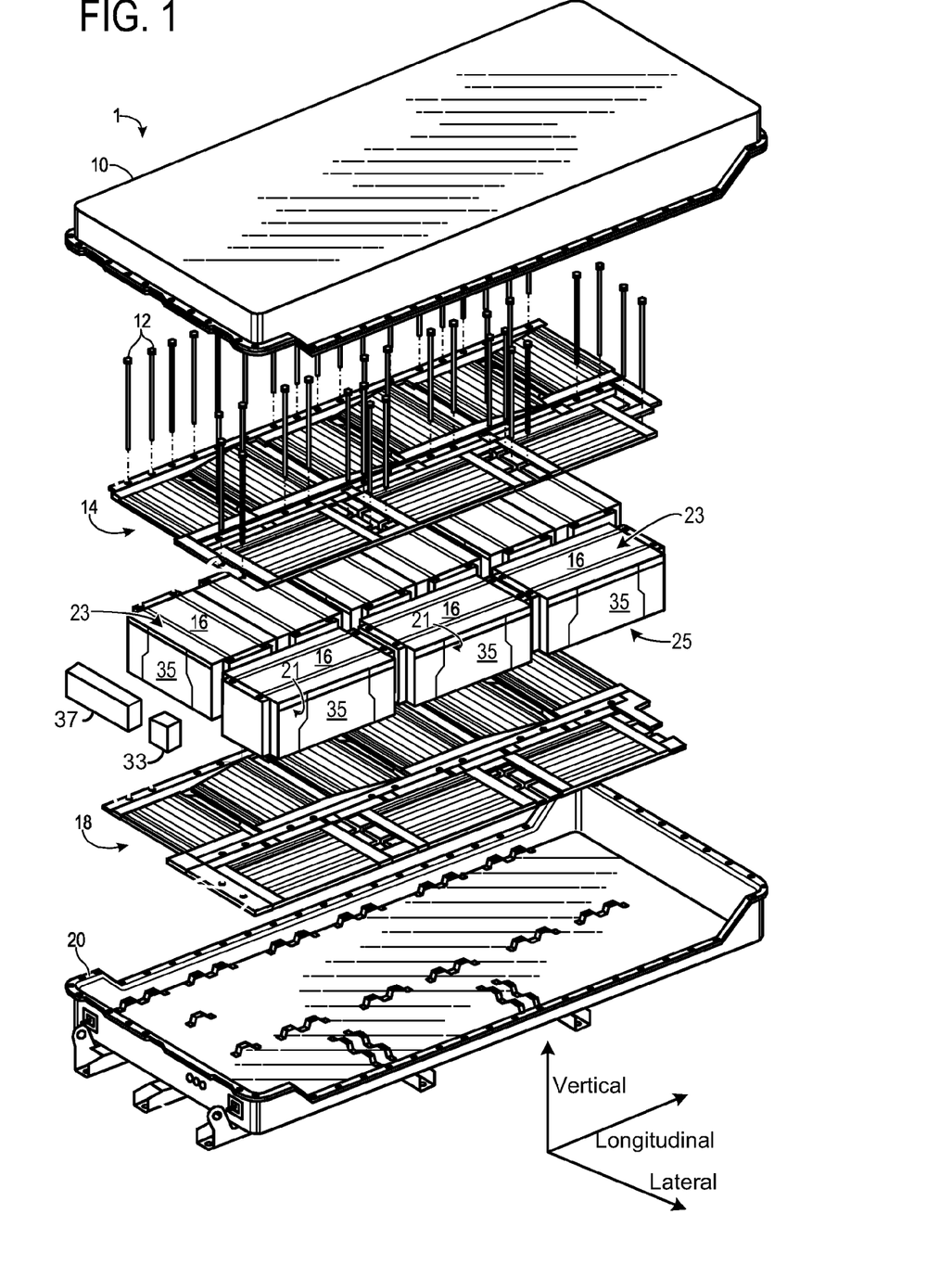
FIG. 1 shows an exploded schematic view of a battery pack or assembly.
Figure 5A:
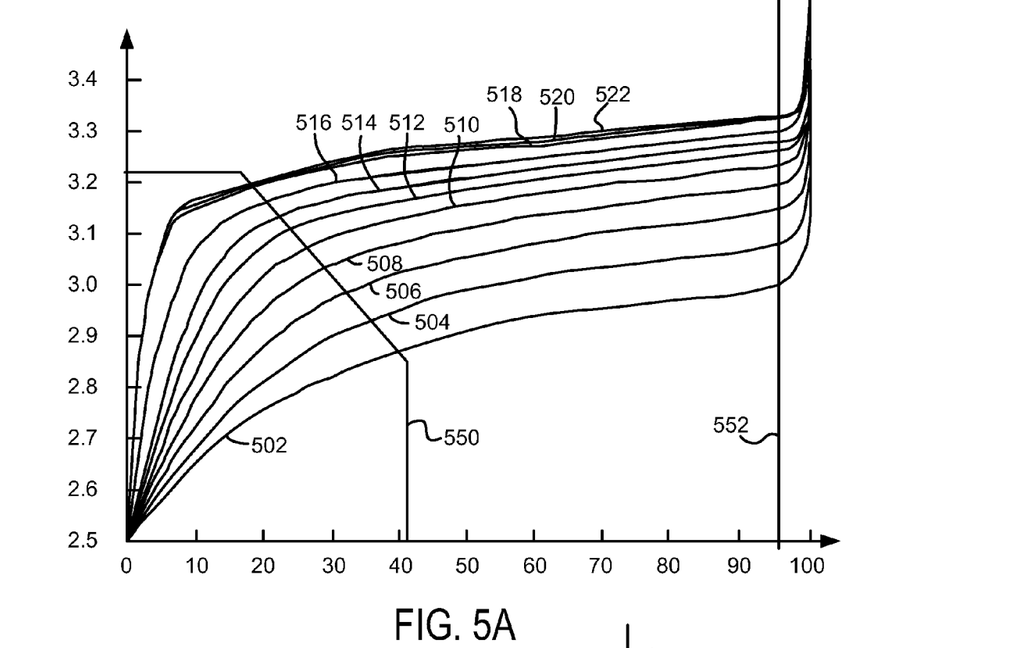
FIG. 5A shows a prophetic example of battery cell charging curves for a new battery cell.
Figure 5B:
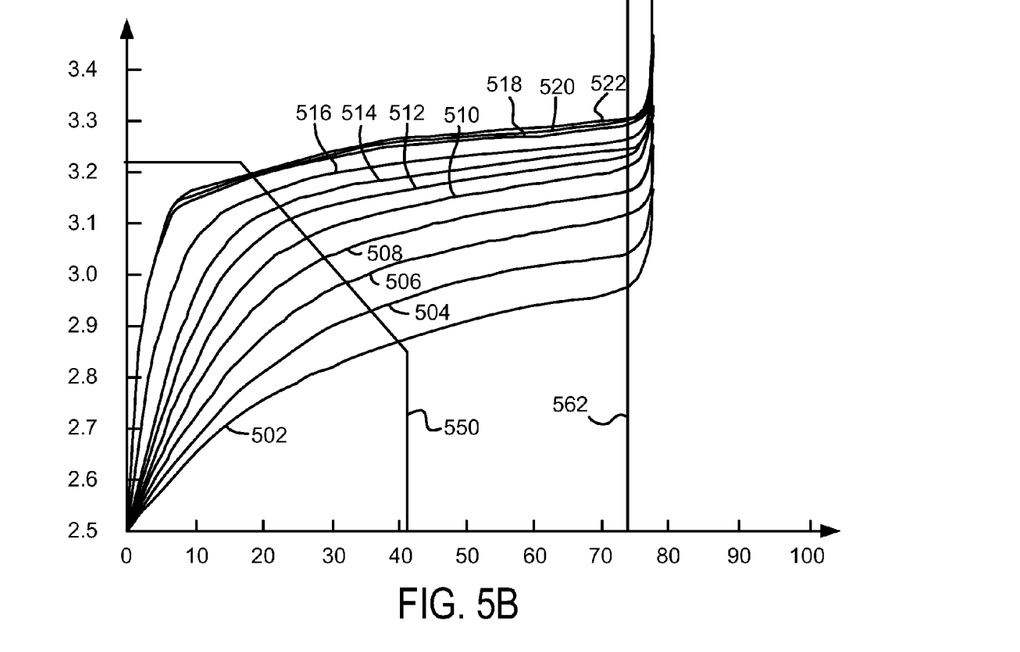
FIG. 5B shows a prophetic example of battery cell charging curves for an aged battery cell.
Figure 6A:
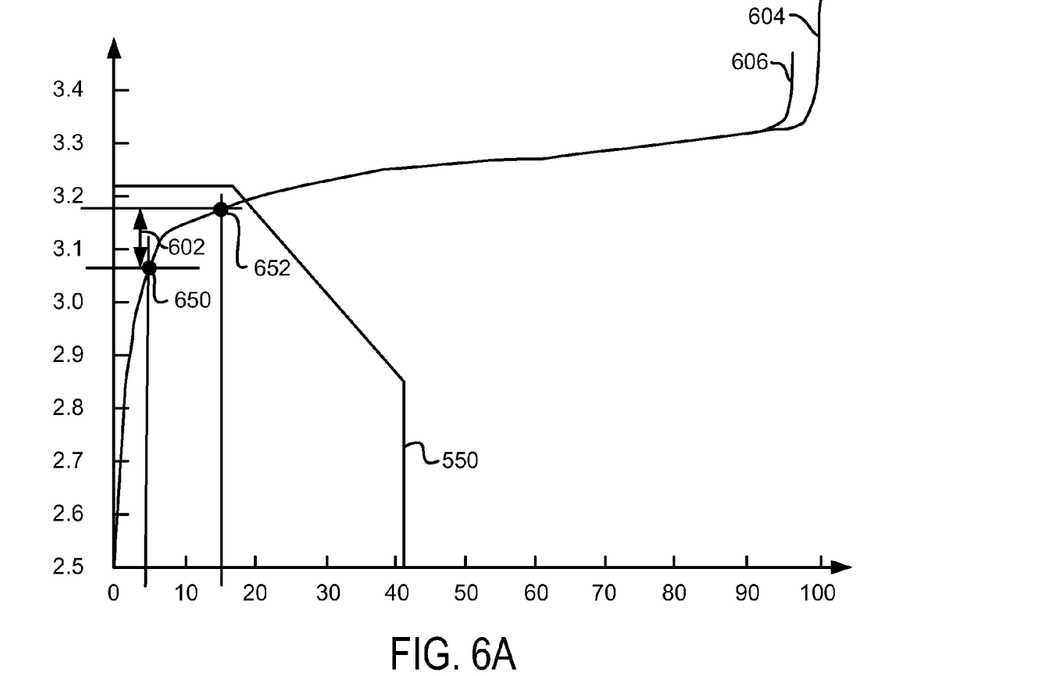
FIG. 6A shows a prophetic example of a charge difference between two battery cells at a lower battery voltage region.
Figure 6B:
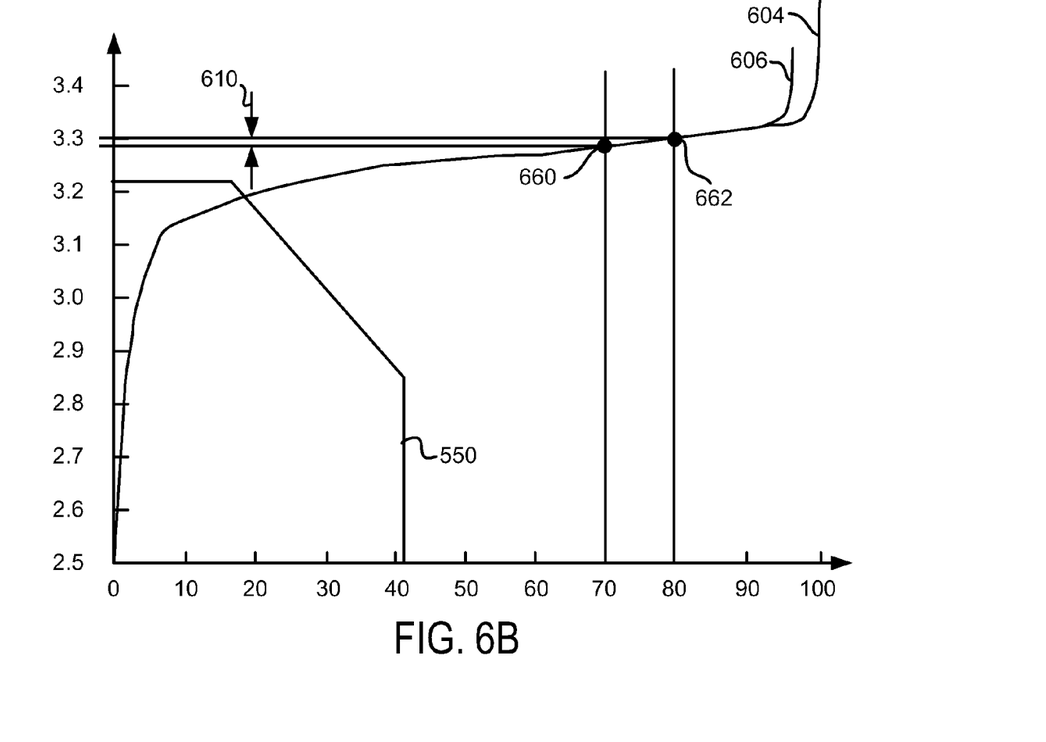
FIG. 6B shows a prophetic example of a charge difference between two battery cells at a middle battery voltage region.

The present description is related to balancing charge between battery cells of a battery pack. In one example, the battery cells may be included in a battery pack as illustrated in FIG. 1. Battery cells such as those illustrated in FIGS. 2-3 may be combined as shown in FIG. 1. Charge differences between battery cells may be reduced or eliminated by the simplified circuitry shown in the electrical schematic of FIG. 4. FIGS. 5A and 5B show battery cell voltage characteristics for new and aged battery cells. The method of FIG. 6 provides for recognizing when open circuit voltage provides more information and using the information during charge balancing between battery cells.

FIG. 1 shows an exploded view of a battery assembly 1. The battery assembly may include a cover 10, coupling devices 12, a first cooling subsystem 14 (e.g., cold plate), a plurality of battery cell modules 16, a second cooling subsystem 18 (e.g., cold plate), and a tray 20. The cover may be attached to the tray via a suitable coupling device (e.g., bolts, adhesive, etc.,) to form a housing surrounding the coupling devices, the cooling subsystems, and the battery modules, when assembled.

The battery cell modules 16 may include a plurality of battery cells configured to store energy. Although a plurality of battery modules are illustrated, it will be appreciated that in other examples a single battery module may be utilized. Battery cell modules 16 may be interposed between the first cooling subsystem 14 and the second cooling subsystem 18, where the battery modules are positioned with their electrical terminals on a side 21 facing out between the cooling subsystems.

Each battery module may include a first side 23 and a second side 25. The first and the second side may be referred to as the top and bottom side, respectively. The top and bottom sides may flank the electrical terminals, discussed in greater detail herein with regard to FIGS. 2-3. In this example, the top side of each battery module is positioned in a common plane in the battery assembly. Likewise, the bottom side of each battery module is positioned in another common plane in the battery assembly. However, in other examples only the top side or the bottom side of each battery module may be positioned in a common plane. In this way, the cooling subsystems may maintain direct contact with the top sides and the bottom sides of the battery modules to increase heat transfer and improve cooling capacity, as described in further detail herein, wherein the cooling subsystems and the battery modules may be in face-sharing contact. Additional details of an exemplary battery module are described herein with regard to FIGS. 2-3. In alternate examples, only one of the cooling subsystems may be included in battery assembly 1, such as an upper cooling subsystem (subsystem 14 in this example). Moreover, the position, size, and geometry of the first and second cooling subsystems are exemplary in nature. Thus, the position, size, and/or geometry of the first and/or second cooling subsystems may be altered in other examples based on various design parameters of the battery assembly.

Battery assembly 1 may also include an electrical distribution module 33 (EDM), monitor and balance boards 35 (MBB), and a battery control module 37 (BCM). Voltage of battery cells in battery cell modules 16 may be monitored and balanced by MBBs that are integrated onto battery cell modules 16. Balancing battery cells refers to equalizing voltages between a plurality of battery cells in a battery cell stack. Further, battery cell voltages between battery cell stacks can be equalized. MBBs may include a plurality of current, voltage, and other sensors. The EDM controls the distribution of power from the battery pack to the battery load. In particular, the EDM contains contactors for coupling high voltage battery power to an external battery load such as an inverter. The BCM provides supervisory control over battery pack systems. For example, the BCM may control ancillary modules within the battery pack such as the EDM and cell MBB. Further, the BCM may be comprised of a microcontroller having random access memory, read only memory, input ports, real time clock, output ports, and a controller area network (CAN) port for communicating to systems outside of the battery pack as well as to MBBs and other battery pack modules.

Figure 2:
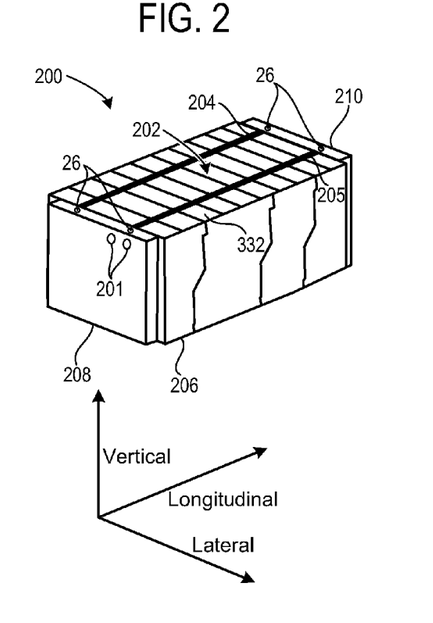
FIG. 2 shows a schematic view of an exemplary battery module.

FIG. 2 shows an exemplary battery module 200 that may be included in the plurality of battery cell modules 16, shown in FIG. 1. Battery module 200 may include a battery cell stack having a plurality of stacked battery cells and output terminals 201. The stacked arrangement allows the battery cells to be densely packed in the battery module.

Figure 3:
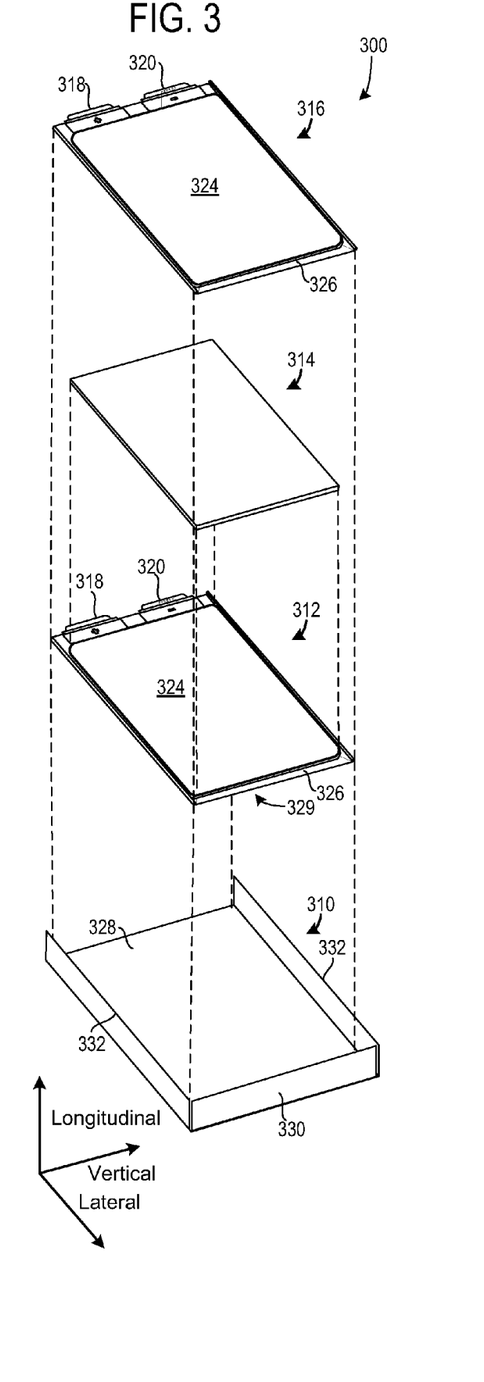
FIG. 3 shows an exploded schematic view of an exemplary battery cell stack.

FIG. 3 shows an exploded view of a portion of an exemplary battery cell stack 300. As shown the battery cell stack is built in the order of a housing heat sink 310, battery cell 312, compliant pad 314, battery cell 316, and so on. However, it will be appreciated that other arrangement are possible. For example, the battery cell stack may be built in the order of a housing heat sink, battery cell, housing heat sink, etc. Further in some examples, the housing heat sink may be integrated into the battery cells.

Battery cell 312 includes cathode 318 and anode 320 for connecting to a bus bar (not shown). The bus bar routes charge from one batter cell to another. A battery module may be configured with battery cells that are coupled in series and/or parallel. Bus bars couple like battery cell terminals when the battery cells are combined in parallel. For example, the positive terminal of a first battery cell is coupled to the positive terminal of a second battery cell to combine the battery cells in parallel. Bus bars also couple positive and negative terminal of battery cell terminals when it is desirable to increase the voltage of a battery module. Battery cell 312 further includes prismatic cell 324 that contains electrolytic compounds. Prismatic cell 324 is in thermal communication with cell heat sink 326. Cell heat sink 326 may be formed of a metal plate with the edges bent up 90 degrees on one or more sides to form a flanged edge. In the example of FIG. 3, two opposing sides include a flanged edge. However, other geometries are possible. Battery cell 312 is substantially identical to battery cell 316. Therefore similar parts are labeled accordingly. Battery cells 312 and 316 are arranged with their terminals in alignment and exposed. In battery module 200 shown in FIG. 2 the electric terminals are coupled to enable energy to be extracted from each cell in the battery module. Returning to FIG. 3, compliant pad 314 is interposed between battery cell 312 and battery cell 316. However, in other examples the compliant pad may not be included in the battery cell stack.

Housing heat sink 310 may be formed by a metal plate having a base 328 with the edges bent up 90 degrees on one or more sides to form a flanged edge. In FIG. 3 longitudinally aligned edge 330 and vertically aligned edges 332 are bent flanged edges. As depicted, the housing heat sink is sized to receive one or more battery cells. In other words, one or more battery cells may be positioned within base 328. Thus, the flanged edges of the battery cells may be in contact with housing heat sink and underside 329 of battery cell 312 may be in contact with the base of the housing heat sink, facilitating heat transfer.

One of the longitudinally aligned edges 332 of the housing heat sink 310 may form a portion of the top side 202 of battery module 200, as shown in FIG. 2. Similarly, one of the longitudinally aligned edges 332 may form a portion of the bottom side of the battery module. Thus, the longitudinally aligned edges of the housing heat sink may be in contact with the first and the second cooling subsystems to improve heat transfer. In this way, heat may be transferred from the battery cells to the exterior of the battery module.

The battery cells may be strapped together by binding bands 204 and 205. The binding bands may be wrapped around the battery cell stack or may simply extend from the front of the battery cell stack to the back of the battery cell stack. In the latter example, the binding bands may be coupled to a battery cover. In other examples, the binding bands may be comprised of threaded studs (e.g., metal threaded studs) that are bolted at the ends. Further, various other approaches may be used to bind the cells together into the stack. For example, threaded rods connected to end plates may be used to provide the desired compression. In another example, the cells may be stacked in a rigid frame with a plate on one end that could slide back and forth against the cells to provide the desired compressive force. In yet other examples, rods held in place by cotter pins may be used to secure the battery cells in place. Thus, it should be understood that various binding mechanisms may be used to hold the cell stack together, and the application is not limited to metal or plastic bands. Cover 206 provides protection for battery bus bars (not shown) that route charge from the plurality of battery cells to output terminals of the battery module.

The battery module may also include a front end cover 208 and a rear end cover 210 coupled to the battery cell stack. The front and rear end covers include module openings 26. However, in other examples the module openings may be included in a portion of the battery module containing battery cells.

Figure 4:
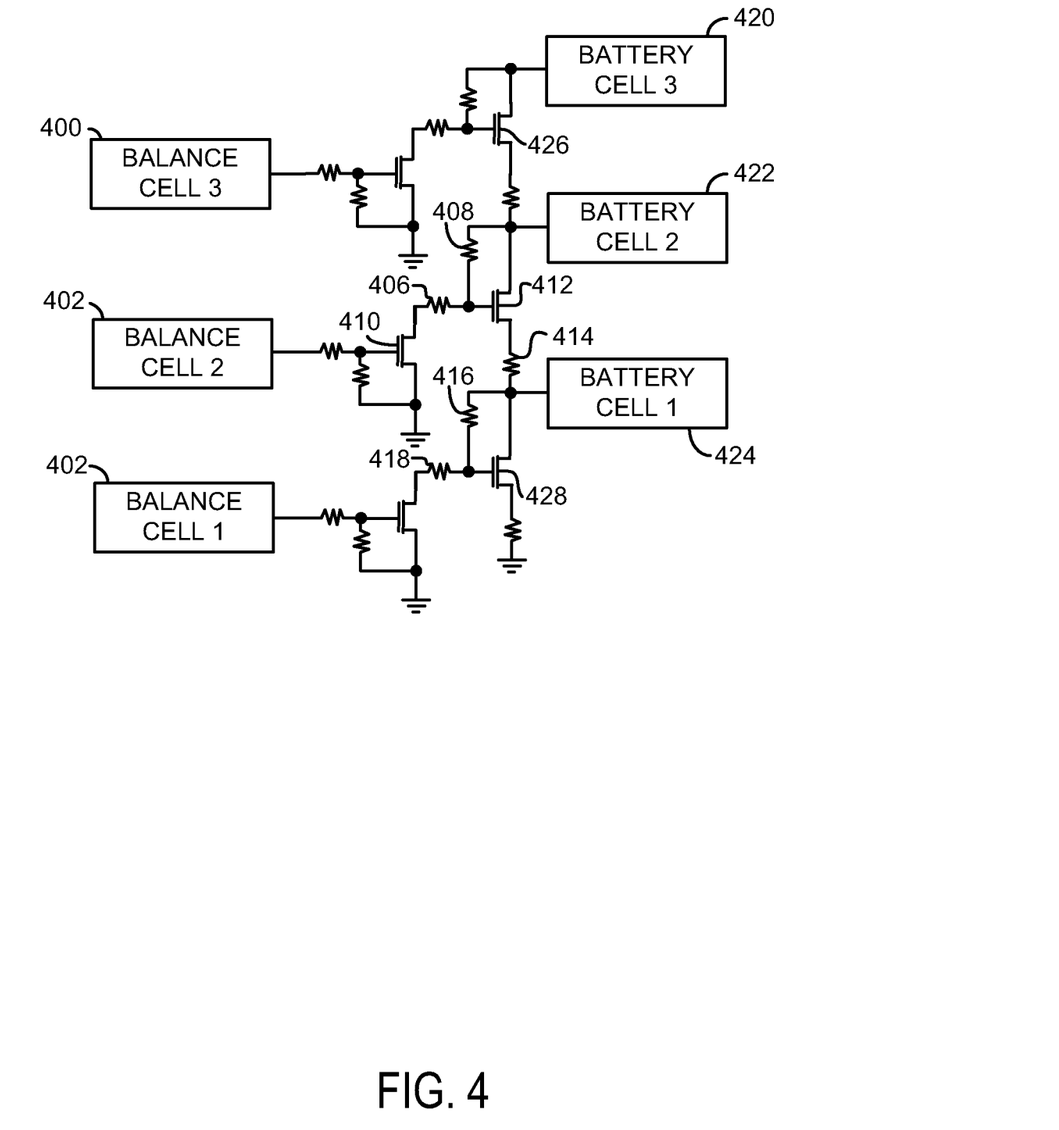
FIG. 4 shows an electrical schematic diagram of example battery charge balancing circuitry.

Referring now to FIG. 4, a schematic view of example battery cell balancing control circuitry is shown. The high potential sides of battery cells 1-3 is shown at 420-424. Since the battery cells are coupled in series, the low side of one battery is coupled to the higher potential of another battery cell. Battery cell balancing may be initiated by a microcontroller on the MBB. Simplified microcontroller output circuitry to balance battery cells is illustrated at 400-404.

The battery cell balancing circuitry illustrated for battery cells 1-3 is substantially the same between battery balancing circuits except for transistor biasing resistors for the FET transistors that switch load resistors in parallel with battery cells. The biasing resistors are adjusted to compensate for the changing potential for each additional battery cell in the series of battery cells.

Charge of battery cell number 2 is reduced when FET 412 is activated (e.g., closed) thereby coupling load resistor 414 in parallel to battery cell number 2. FET 412 is activated when FET 410 conducts from a signal initiated by microcontroller signal input 402. When FET 410 conducts, one side of resistor 406 is referenced to ground while the other side is coupled to resistor 408 which is turn is coupled to the high potential side of battery cell number 2. Thus, the voltage developed between resistor 406 and 408, as applied to the gate of FET 412, is related to the voltage of battery cell number 2 with respect to ground and the ratio of resistances 406 and 408. FETs 426 and 428 that balance battery cell numbers 1 and 3 are the same as FET 412. Since the potential of battery cell 3 with respect to ground increases from that of battery cell number 2, the bias resistors coupled to the gate of FET 426 are adjusted to ensure FET 426 switches when microcontroller circuit input 400 changes state. Likewise, the potential of battery cell 1 with respect to ground decreases from that of battery cell number 2, and bias resistors 416 and 418 coupled to the gate of FET 428 are adjusted to ensure FET 428 switches when microcontroller circuit input 404 changes state.

Referring now to FIG. 5A, a prophetic example of charging curves for a battery cell having full charging capacity is shown. The illustrated curves may be applicable for the system shown in FIGS. 1-4.

The plot in FIG. 5A has a Y axis that represents battery cell open circuit voltage, and voltage increases in the direction of the Y axis arrow. The X axis represents percent battery cell state of charge (SOC) (e.g., the percentage of the total amount of charge the battery cell is rated to store), and percent state of charge increases in the direction of the X axis arrow. For example, a value of 10 along the X axis represents 10% of the full charge a new battery cell is rated to store. A value of 100 represents that the battery cell is at full charge capacity of a new battery.

Curves 502-522 are curves that show battery cell voltage versus battery cell percent state of charge for different battery cell temperatures. In particular, curve 502 applies for a battery cell temperature of −15° C., curve 504 applies for a battery cell temperature of −10° C., curve 506 applies for a battery cell temperature of −5° C., curve 508 applies for a battery cell temperature of 0° C., curve 510 applies for a battery cell temperature of 5° C., curve 512 applies for a battery cell temperature of 10° C., curve 514 applies for a battery cell temperature of 15° C., curve 516 applies for a battery cell temperature of 20° C., curve 518 applies for a battery cell temperature of 25° C., curve 520 applies for a battery cell temperature of 30° C., and curve 522 applies for a battery cell temperature of 35° C.

Lines 550 and 552 denote boundaries of three battery cell charge regions. The lower voltage charging region (e.g., region 1) lies from the left of line 550 to the Y axis. The middle voltage charging region (e.g., region 2) lies between lines 550 and 552. The higher voltage charging region (e.g., region 3) lies to the right of line 552. The boundaries of the three battery cell charge regions may be variable depending on the measurement error in determining battery cell open circuit voltage. For example, if the system has a voltage measurement error of 50 mV, a first set of battery cell charge regions may be selected. If the system has a voltage measurement error of 100 mV, a second set of battery cell charge regions different from the first set of battery cell charge regions may be selected. Note that the voltage measurement errors during measurement of battery cell voltage may originate from one or more sources such as ADC quantization errors and CPU rounding errors.

For the battery temperatures shown, it can be seen from curves 502-522 that battery cell voltage increases with battery state of charge and battery temperature.

Further, in the middle voltage region, battery voltage changes little with increasing battery state of charge. For example, curve 508 changes slightly more than 0.1 volts between 30 percent state of charge and 95 percent state of charge. Thus, a small change in voltage corresponds to a large change in percentage charge stored in the battery cell. Therefore, in the middle voltage region, a precise and high resolution voltage reading is required to accurately determine a state of battery charge. On the other hand, in the lower voltage region, curve 508 changes by approximately 0.5 volts from 0 percent battery charge to 30 percent battery charge. Consequently, a more precise estimate of battery cell state of charge can be made with a lower resolution battery cell open circuit voltage estimate. Similarly, in the higher voltage region, curve 508 changes by tenths of volts from 95 to 100 percent rated battery charge level. Consequently, a more accurate battery state of charge may be estimated from battery cell open circuit voltage in the lower and higher battery cell voltage regions.

In one example, a battery state of charge can be estimated in the lower or higher battery cell voltage region. As the battery is charged or discharged it enters the middle voltage region where the battery state of charge can be revised in response to an integrated coulomb count estimated from battery cell current and charge or discharge time. Further, when battery cells are balanced in the middle voltage region to extend battery cell charging or discharging cycles, the battery cells subject to charge balancing are balanced according to the differences in battery state of charge estimated while the battery cells were in the lower or high battery cell voltage regions. For example, if a first battery cell has a voltage output of 3.05 volts corresponding to 10 percent of the battery cell's full charge capacity and a second battery cell has a voltage output of 3.12 volts corresponding to 15 percent of the battery cell's full charge capacity, the second battery cell can be drained of 5 percent of charge capacity in the middle voltage region during a battery charging cycle so that both battery cells reach 90 percent state of charge at the same time.

Referring now to FIG. 5B, a prophetic example of charging curves for an aged battery cell having less than full charging capacity is shown. The illustrated curves may be applicable for the system shown in FIGS. 1-4.

The plot in FIG. 5B has X and Y axis that are the same as those illustrated in FIG. 5A. Further, curves 502-522 represent the same battery operating conditions as shown in FIG. 5A. And, line 550 denotes the same lower voltage boundary as shown in FIG. 5A. Therefore, for the sake of brevity, the description of FIG. 5A applies to the similarly marked elements of FIG. 5B, and the description of these elements is omitted in the description of FIG. 5B.

FIG. 5B includes line 562 which redefines the boundary between the middle voltage charging region and the higher voltage charging region. In particular, for FIG. 5B, the middle voltage charging region lies between line 550 and line 562. The higher voltage charging region lies to the right of line 562. During aging a battery cell looses capacity to store charge. This is reflected in FIG. 5B by charging curves 502-522 increasing in voltage before the 100 percent rated charge amount of the X axis is reached. In this example, the battery charge capacity is reduced to approximately 75 percent of the original rated charge storage capacity. In one example, the charge storage capacity of a battery cell can be reduced to a fraction of the rated battery cell charge capacity when the battery voltage increases during charging to a level that is higher than is expected based on coulomb integration. It can also be seen from FIG. 5B that the voltage output from the battery cell does not change with the same amount of charge stored at lower charge levels as compared to a battery having full charge storage capacity (e.g., FIG. 5A). Thus, the lower voltage charging region remains the same between new battery cells and aged battery cells. Accordingly, battery state of charge estimates based on battery voltages in the lower voltage region for aged battery cells can be estimated with the same battery charging curves used to estimate battery state of charge for new battery cells.

Referring now to FIG. 6A, a prophetic example of a charge difference between two battery cells at a lower battery voltage region is shown. The plot of FIG. 6A has X and Y axis that are the same as those illustrated in FIG. 5A. Further, the line 550 that denotes the lower voltage region is the same as those shown in FIG. 6A. Therefore, for the sake of brevity, the description of FIG. 5A applies to the similarly marked elements of FIG. 6A, and the description of these elements is omitted in the description of FIG. 6A.

FIG. 6A shows curves 604 and 606 representing characteristic charging curves for two battery cells operating under substantially the same conditions (e.g., the same battery cell temperature). Curve 604 represents the charge storage capacity versus voltage of a first battery cell. Curve 606 represents the charge storage capacity versus voltage of a second battery cell. Curve 604 indicates that the first battery cell has higher charge storage capacity than the second battery cell. It can be seen that curve 606 begins to increase in voltage at about 8% lower charge capacity than curve 604. Thus, the second battery cell has the capacity to store about 8% less charge than the first battery cell.

Markers 650 and 652 indicate charge levels when the first battery cell and the second battery cell are drained of equivalent amounts of charge to a point where the battery cells enter the lower battery charge region to the left of line 550. The charge remaining in the first battery cell is indicated by marker 652 while the charge remaining in the second battery cell is indicated by marker 650. Thus, it can be seen that when two battery cells having different charge capacities are drained from a full charge level, a difference in output voltage between the two battery cells is present. When the two battery cells are discharged enough to enter the lower voltage region to the left of line 550, the voltage difference becomes more pronounced. In this example, a difference of about 8% in charge capacity results in a voltage difference of a little more than 0.1 volts. The voltage difference is indicated by marker 602. If the battery cells are discharged further, the voltage difference increases even more. Thus, the difference between the charge capacities of the two battery cells becomes more apparent when the two battery cells are discharged to a lower voltage level region of the battery charging curves 604 and 606.

Referring now to FIG. 6B, a prophetic example of a charge difference between two battery cells at a middle battery voltage region is shown. The plot of FIG. 6B has X and Y axis that are the same as those illustrated in FIGS. 5A and 6A. Further, the curves 604 and 606 as well as line 550 that denotes the lower voltage region are the same as those shown in FIG. 6A. Therefore, for the sake of brevity, the description of FIG. 6A applies to the similarly marked elements of FIG. 6B, and the description of these elements is omitted in the description of FIG. 6B.

In FIG. 6B an equivalent amount of charge has been added to the first and second battery cells. The first battery cell is at a charge level indicated by marker 660 while the second battery cell is at a charge level indicated by marker 662. Although, a charge difference of about 8% remains between the first and second battery cells, the voltage level difference between the first and second battery cells is about 20 milli-volts in FIG. 6B. Thus, by simply charging the two battery cells, it becomes more difficult to determine a charge difference between the first and second battery cells. Further, since it is difficult to determine an amount of charge stored in each battery cell in the middle voltage range, it can be difficult to balance charge between two battery cells if the amount of charge added or drained from the battery cell is based on the voltage of the battery cell while the battery cell is in the middle voltage region. However, as described in the method of FIGS. 7 and 8, a charge difference can be determined in a lower voltage region as shown in FIG. 6A, and then drained from a battery cell in the middle voltage region of FIG. 6B. It can be more desirable to drain or add voltage in the middle voltage range (e.g., while two battery cells are at states of charge 660 and 662) because the battery cells may not enter the lower voltage or higher voltage ranges often because of charging or discharging limitations. Consequently, by knowing the difference in charge levels between battery cells it is possible to perform cell balancing after a predetermined charge/discharge cycles without having to remain in the low or high charge region of the battery cell charging curve.

Figure 7:
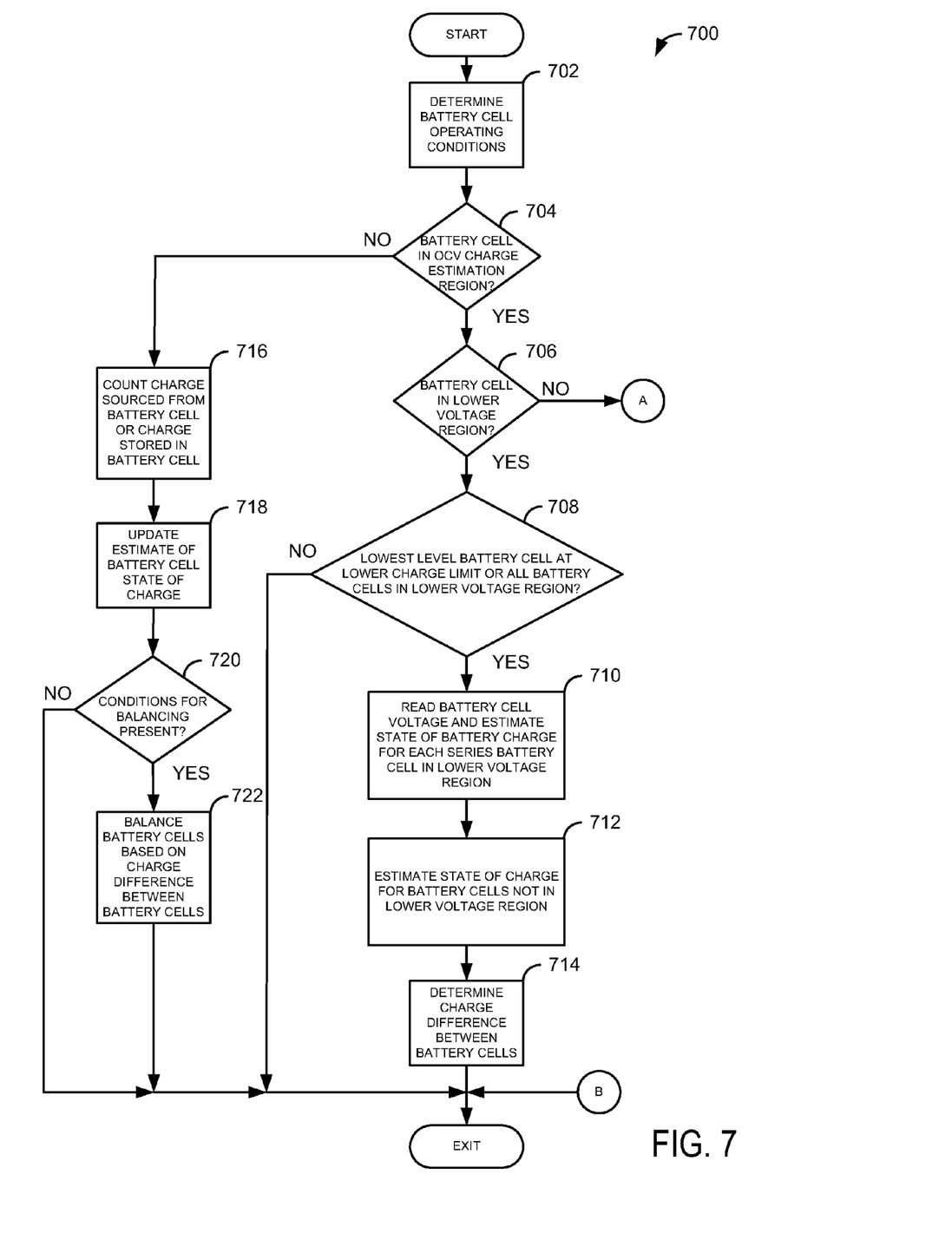
FIGS. 7 and 8 show a flowchart of a method for balancing charge of battery cells.
Figure 8:
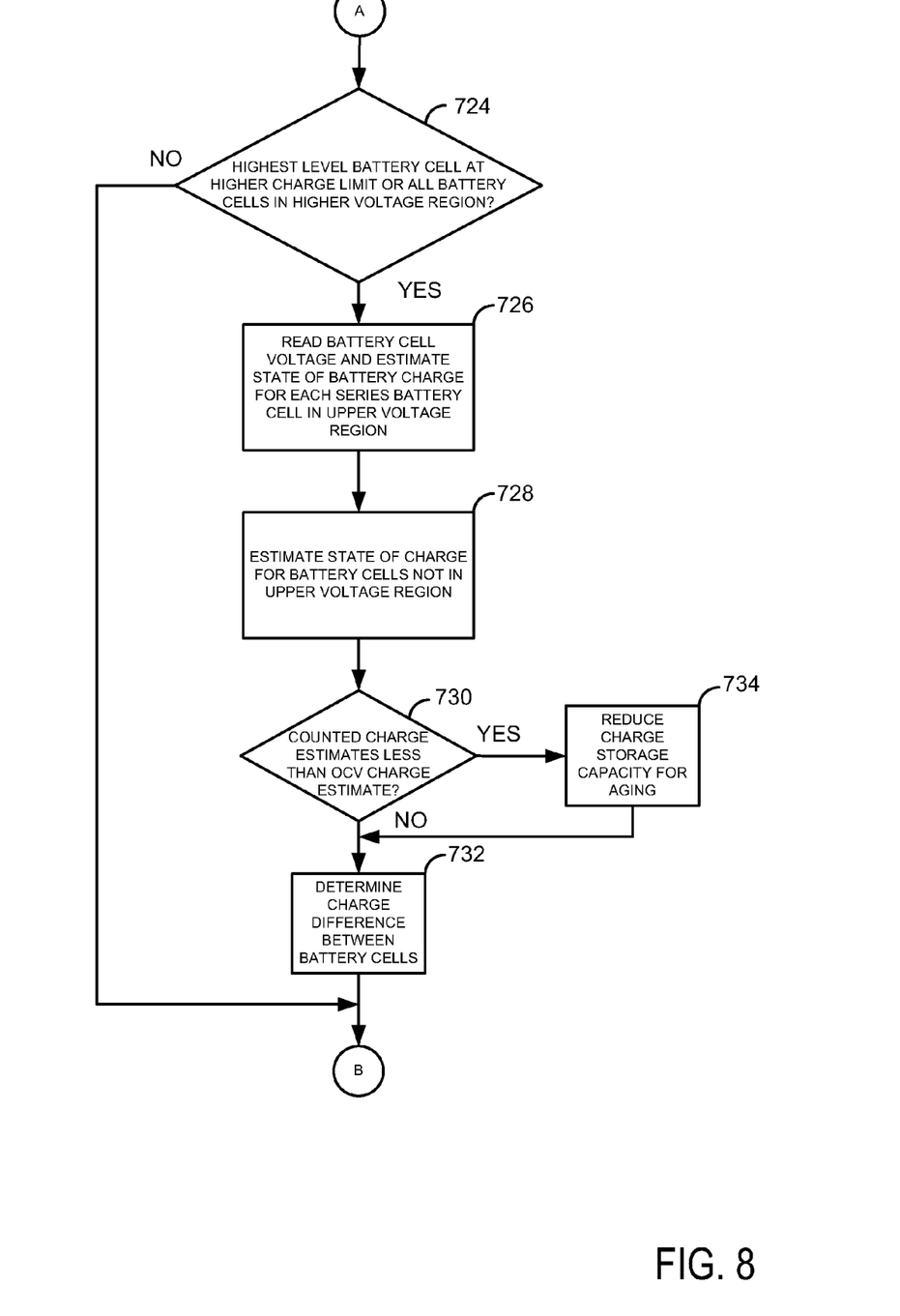

Referring now to FIGS. 7 and 8, a flowchart for a method of balancing charge of battery cells is shown. The method of FIGS. 7 and 8 is executable by instructions of BCM controller 37 or MBB 35 of FIG. 1. Further, method 700 applies to systems where charge is balanced via passive devices as well as in systems where charge is shuttled between battery cells.

At 702, method 700 determines battery cell operating conditions. Battery cell operating conditions may include but are not limited to battery cell voltages, battery cell temperatures, and battery cell current flow. Method 700 proceeds to 704 after battery cell operating conditions are determined.

At 704, method 700 judges whether or not battery cells are in an open circuit voltage (OCV) state of charge estimation region (e.g., region 1 or 3 of FIG. 5A). In this example, the middle charge region (e.g., region 2 of FIG. 5A) is not an open circuit voltage state of charge estimation region because the battery open circuit voltage changes little with battery charge amount. The battery charge estimation regions may be empirically determined and stored into memory of a battery pack controller, and a battery cell may be determined to be in a state of charge estimation region based on an open circuit voltage of the battery cell. For example, if a battery cell has an open circuit voltage of 2.9 volts it may be determined that the battery cell is in a lower voltage region where battery state of charge can be estimated from battery open circuit voltage. If the battery cell has an open circuit voltage of 3.15 volts it may be determined that the battery cell is in a middle voltage region where battery state of charge is not estimated based on the battery's present open circuit voltage. Rather, the state of charge of a battery cell is estimated based on an amount of current the battery cell sinks or sources after exiting the lower or higher voltage regions and the battery charge determined from the open circuit voltage of the battery cell in the open circuit voltage state of charge estimation region. If the battery cell has an open circuit voltage of 3.3 volts it may be determine that the battery cell is in the higher voltage region where battery state of charge is estimated based on battery cell open circuit voltage. Thus, the way battery state of charge is estimated may be determined according to charge estimation regions that are determined according to battery voltage.

It should also be mentioned that the battery charge estimation regions may be adjusted to account for battery aging and type of battery cell. For example, a higher voltage charging region can be adjusted in response to battery cell aging. In particular, the higher voltage charging region boundary can be moved from a higher percentage of the amount of charge a battery cell is rated to store to a lower percentage of the amount of charge the battery cell is battery cell is rated to store. As one example, the higher voltage charging region of FIG. 5A is moved to the higher voltage charging region of FIG. 5B in response to battery aging. The higher voltage charging region is moved to a lower percentage of the charge a battery cell is rated to store when a voltage of the battery increases before the battery stores its rated charge capacity. In one example, the amount of charge stored in a battery is estimated according to an amount of current a battery cell sinks or sources. For example, if a battery cell has a rated storage capacity of X amp-hours, and Y amps have been supplied to charge the battery cell for 0.5 hours after the battery cell state of charge was estimated as 15 percent of rated storage capacity while the battery cell the lower voltage region, then the battery state of charge can be estimated by 0.15*X+Y*0.5 amp-hours.

If method 700 judges that the battery cells are not in the open circuit voltage charge estimation region, method 700 proceeds to 716. Otherwise, method 700 proceeds to 706.

At 706, method 700 judges whether or not one or more battery cells of a battery pack are in a lower voltage region. As discussed above, a lower voltage region may be predetermined battery voltages that are stored in memory of a battery pack controller. Further, the lower voltage region may be adjusted for battery cell temperature and battery cell type or chemistry. As one example, FIG. 5A shows a lower voltage region to the left of line 550. If method 700 judges that the battery cell is in the lower voltage region, method 700 proceeds to 708. Otherwise, method 700 proceeds to 724 of FIG. 8 where battery state of charge can be estimated based on battery cell open circuit voltages for battery cells outputting higher voltages.

At 708, method 700 judges whether or not the battery cell with the lowest output voltage is at a lower charge limit or if all battery cells of the battery pack are in a lower voltage region. If so, method 700 proceeds to 710. Otherwise, method 700 proceeds to exit so that additional charge may be withdrawn from battery cells so that battery state of charge may be estimated from battery open circuit voltage.

At 710, method 700 reads battery cell voltage for each series battery cell and estimates battery state of charge for battery cells that are in the predetermined lower voltage region. Battery cell voltages are read by sampling the battery cells. All battery cells of a battery pack or battery cell stack may be sampled at substantially a same time via storing battery charge to capacitors and sampling the capacitors via an ADC. In one example, battery state of charge is estimated from curves similar to those of FIG. 5A. The newly estimated state of charge for each battery cell in the lower voltage region becomes the basis for estimating the state of charge for each battery cell when the battery cells are charged and enter the middle voltage region. Method 700 proceeds to 712 after state of charge is estimated for each battery cell in the lower voltage region.

Note that a single series battery cell may be comprised of several battery cells electrically coupled in parallel. Thus, each of the parallel battery cells output an equivalent voltage.

At 712, method 700 estimates the state of charge for any series battery cells that do not enter the lower voltage region. The state of charge for series battery cells that do not enter the lower voltage region is determined according to the same procedure described below with reference to 716 and 718. Method 700 proceeds to 714 after the state of charge is estimated for battery cells that are not in the lower voltage region.

At 714, method 700 determines charge difference between series battery cells. In one example, the state of charge for the series battery cell outputting the lowest voltage is compared to the state of charge of the remaining series battery cells by subtracting the state of charge of the lowest series battery cell from the state of charge of the other series battery cells. In this way, the series battery cell with the lowest charge capacity can be compared to the charge capacity of other series battery cells so that it may be determined which battery cells receive charge or have charge drained during battery pack operation. Method 700 proceeds to exit after the charge difference between series battery cells is determined.

At 716, method 700 counts charge that series battery cells sink or source while operating in the middle charge region where it may be difficult to accurately determine battery cell state of charge solely from battery cell open circuit voltage. In one example, current entering or exiting individual battery cell stacks may be monitored to determine an amount of current a series battery cell is sinking or sourcing. In another example, the total amount of current a battery pack sinks or sources may be determined via a single current sensor. The total amount of current may then be divided between individual battery cell stacks and battery cells so that an amount of current a single series battery cell sinks or sources may be determined. The current may be integrated over a charging or discharging cycle so that the total amount of current during the charging or discharging cycle can be determined. The integrated amount of current can be converted to coulombs so that the amount of charge entering or exiting a battery cell may be determined. Method 700 proceeds to 718 after determining a number of coulombs a battery cell sinks or sources.

At 718, method 700 takes the counted number of coulombs for each series battery cell and adds them to a state of charge estimated for each battery cell from battery cell open circuit voltage. Thus, the battery state of charge estimate in the middle voltage region is based on an open circuit state of charge estimate that is based on battery voltage and a coulomb count estimate that is based on battery current. Each battery cell state of charge is updated as method 700 executes.

At 720, method 700 judges whether or not conditions are present for battery cell charge balancing. In one example, battery cell charge balancing may be initiated once during a battery charging cycle. In other examples, battery cell charge balancing may be initiated once during a battery discharging cycle. In other examples, battery cell charge balancing may be initiated a plurality of times during battery charging and discharging cycles. For example, battery charge balancing may be initiated after a battery cell or battery pack sinks a predetermined amount of current. On the other hand, battery charge balancing may be initiated after a battery cell or battery pack sources a predetermined amount of current. In another example, battery cell charge balancing may be initiated if a predetermined charge or voltage difference between battery cells is determined For example, an amount of charge stored in first and second battery cells can be estimated from the open circuit voltage of each battery cell while the battery cells were in a lower voltage region and from an amount of current the battery cells sink or source. If it is determined that a charge difference greater than a predetermined amount is present, battery cell charge balancing may be initiated. In other examples, battery cell balancing is initiated when one or more battery cells reach a predefined voltage. Thus, battery cell charge balancing can be initiated when the battery cells are not in the open circuit voltage state of charge estimation region and while preconditions are met.

If method 700 judges that conditions for battery cell charge balancing are present, method 700 proceeds to 722. Otherwise, method 700 proceeds to exit.

At 722, method 700 balances series battery cells in response to the difference between the charge differences between series battery cells as determined at 714 or 732. In some examples, the battery cells are configured so that each series battery cell of a battery cell stack sinks or sources an amount of current equal to the amount of current other series battery cells of the battery cell stack sink or source. Therefore, any difference in charge between series battery cells may be attributable to a difference in charge storage capacity between battery cells.

The difference in battery cell charge capacity can be mitigated by adding or draining charge from individual series battery cells. For example, if it is determined that a first battery cell is storing 100 more coulombs than a second battery cell, the charge of each battery cell determined from the open circuit voltages from each battery cell while the battery cells are in a lower voltage region, 100 coulombs may be drained from the first battery cell by the circuit of FIG. 4, for example, while the battery cells are in the middle voltage region. As a result, when current is supplied to both battery cells in the same amount, the cells can reach a voltage indicative of a fully charged state at substantially the same time so that all battery cells may be charged to a high level. The amount of charge dissipated by the load resistor can be determined from the time and amount of current flowing through the load resistor. Thus, although the first battery cell has a higher charging capacity than the second battery cell, the battery cells reach fully charged conditions at the same time. Likewise, if the two battery cells are sourcing current, 100 coulombs may be drained from the higher capacity battery so that both battery cells reach a low voltage limit at substantially the same time.

In another example, where charge may be shuffled between battery cells (e.g., in U.S. patent application Ser. No. 12/820,411 hereby fully incorporated by reference for all intents and purposes), 100 coulombs of charge may be added to the second battery cell during a battery discharge cycle so that the first and second battery cells reach a lower voltage limit at substantially the same time. Likewise, 100 coulombs of charge may be drained from the first battery cell during a battery charging cycle so that the first and second battery cells reach a higher voltage limit at substantially the same time. In this way, charge may be balanced between battery cells based on battery state of charge estimated from a specified voltage region and a charge difference between battery cells. Further, charge may be balanced between battery cells based on battery state of charge estimated from a specified voltage region and charge estimated from current as well as a charge difference between battery cells. The method of FIG. 8 is a specific example of battery cell balancing that may be provided at 722. Method 700 proceeds to exit after balancing charge between battery cells.

At 724, method 700 judges whether or not the battery cell with the highest output voltage is at a higher charge limit or if all battery cells of the battery pack are in a higher voltage region. If so, method 700 proceeds to 726. Otherwise, method 700 proceeds to exit so that additional charge may be added to battery cells so that battery state of charge may be estimated from battery open circuit voltage.

At 726, method 700 reads battery cell voltage for each series battery cell and estimates battery state of charge for battery cells that are in the predetermined higher voltage region. In one example, battery state of charge is estimated from curves similar to those of FIG. 5A. The newly estimated state of charge for each battery cell in the higher voltage region becomes the basis for estimating the state of charge for each battery cell when the battery cells are charged and enter the middle voltage region. Method 700 proceeds to 728 after state of charge is estimated for each battery cell in the higher voltage region.

At 728, method 700 estimates the state of charge for any series battery cells that do not enter the higher voltage region. The state of charge for series battery cells that do not enter the higher voltage region is determined according to the same procedure described below with reference to 716 and 718. Method 700 proceeds to 730 after the state of charge is estimated for battery cells that are not in the higher voltage region.

At 730, method 700 judges whether or not the counted charge for each battery cell of a battery pack from 716-718 is less than a charge estimate from open circuit voltages in the higher voltage region. In other embodiments, method 700 judges whether or not the counted charge for each battery cell of a battery cell pack is less than charge estimates from open circuit voltages in the higher voltage region by a predetermined amount of charge. For example, if method 700 determines that a battery cell is at 95 percent of the rated charge capacity of the battery cell from the open circuit voltage and if method 700 determines that the battery cell is at 85 percent of rated charge capacity of the battery cell from battery cell current and a previous battery cell open circuit voltage (e.g. at 716 and 718), method 700 can proceed to 734 if the 10 percent difference in charge is greater than some predetermined threshold amount of charge. However, if the predetermined threshold amount of charge is a 20 percent threshold, method 700 proceeds to 732.

If method 700 judges that a charge estimate based on counted coulombs is less than an open circuit voltage charge estimate, method 700 proceeds to 734. Otherwise, method 700 proceeds to 732.

At 734, method 700 reduces the charge storage capacity of the battery cell for aging. In one example, the charge storage capacity of the battery cell is reduced to an amount that is based on a number of coulombs added or subtracted from a charge estimate that is based on open circuit voltage. Further, method 700 can reduce the total charge storage capacity from the rated charge storage capacity of a battery cell so that the higher charge limit (e.g., 552 of FIG. 5A) corresponds to a lower level of charge. Additionally, lowering the total charge storage capacity of a battery cell from the rated charge storage capacity can bring the charge estimate from open circuit voltage charge estimate and the charge estimated from a previous open circuit voltage and integrated current amount into agreement. And, reducing the total charge storage capacity of the battery from the rated charge storage capacity can change where charge balancing occurs. For example, if charge balancing is scheduled when a battery cell is at 50 percent of charge storage capacity, charge balancing is started at a lower absolute charge level after the total charge storage capacity is reduced from the rated charge storage capacity. In particular, if rated charge capacity is 0.5 amp-hours, charge balancing is scheduled when the battery cell is at 0.25 amp-hour charge level. However, if the total charge capacity is reduced from the rated charge capacity to a level of 0.4 amp-hours, charge balancing is scheduled when the battery cell is at 0.2 amp-hour charge level. Method 700 proceeds to 732 after the battery cell total charge storage capacity is reduced for aging.

At 732, method 700 determines charge difference between series battery cells. In one example, the state of charge for the series battery cell outputting the highest voltage is compared to the state of charge of the remaining series battery cells by subtracting the state of charge of the highest series battery cell from the state of charge of the other series battery cells. In this way, the series battery cell with the highest charge capacity can be compared to the charge capacity of other series battery cells so that it may be determined which battery cells receive charge or have charge drained during battery pack operation. Method 700 proceeds to exit after the charge difference between series battery cells is determined.

Thus, the method of FIGS. 7 and 8 samples charge of battery cells when the battery cells are at a first voltage and balances charge of the battery cells based on or in response to a difference in charge stored by the battery cells after sinking or sourcing charge to the battery cells. Further, the method of FIG. 7 can reduce the total charge storage capacity of a battery cell to account for aging, thereby allowing the battery cells to balance at different times related to the total charge storage capacity of the battery cells of the battery pack.

In this way, the method of FIGS. 7 and 8 provides for a method for balancing charge between battery cells, comprising: operating a first battery cell with a first voltage and a second battery cell with a second voltage, the first and second battery cells both operating in a first charge region; and charge balancing between the first battery cell and the second battery cell in a second charge region different from the first charge region, the charge balancing responsive to a voltage difference between the first voltage and the second voltage. The method includes where the first charge region is a lower charge region than the second charge region. The method includes where the charge balancing includes adding or draining charge from the first battery cell or the second battery cell. The method includes where the second charge region occurs at a battery cell voltage where a change in battery cell voltage of 0.1 volts produces a change in a stored battery charge of less than 20 percent of rated charge capacity of the first battery cell. The method includes where the first charge region has a higher slope than the second charge region. The method includes where an amount of charge added to or drained from the first or second battery cell is based on an amount of charge represented via the voltage difference.

The method of FIGS. 7 and 8 also provides for a method for balancing charge between battery cells, comprising: operating a first battery cell and a second battery cell in a first region of battery charge, the first and second battery cells operating with a charge imbalance indicated by a voltage difference between voltage of the first battery cell and voltage of the second battery cell; charging both the first and second battery cells to transition both the first and second battery cells to a second region of battery charge; and operating the first and second battery cells in the second region to reduce the charge imbalance, including adding or subtracting an amount of charge to the first or second battery cell in the second region of battery charge, the amount of charge based on the voltage difference in the first region of battery charge. The method includes where subtracting charge of the first or second battery cell balances charge between the first and second battery cells, and where the first region of battery charge is a lower battery charge than the second region of battery charge. The method includes where the first region of battery charge is a higher charge than the second region of battery charge. The method includes where a slope of battery voltage versus battery cell charge of the first region is higher than the slope of battery voltage versus battery cell charge of the second region. The method includes where charge is added to the first or second battery cell via a transformer. The method includes where charge is subtracted from the first or second battery cell via a resistor. The method further comprises basing a timing of adding or subtracting charge from the first or second battery cell on an amount of charge stored in the first or second battery cell estimated from an amount of current the first or second battery cell sinks or sources and an open circuit voltage of the first or second battery cell in the second region of battery charge. The method further comprises integrating an amount of charge added or subtracted from the first battery cell after estimating the amount of charge stored in the first battery cell.

The method of FIGS. 7 and 8 further provides for a method for balancing charge between battery cells, comprising: estimating an amount of charge stored in a first battery cell in response to an open circuit voltage of the first battery cell, the open circuit voltage in a first voltage region of battery cell output voltage; estimating an amount of charge stored in a second battery cell in response to an open circuit voltage of the second battery cell, the open circuit voltage in a first voltage region of battery cell output voltage; reducing a total charge capacity of the first or second battery cell from a rated charge storage capacity in response to an open circuit voltage of the first or second battery cell and an integrated charge capacity of the first or second battery cell; balancing charge of the first or second battery cell battery cell in a second region of battery cell output voltage in an amount of charge related to a difference between the amount of charge stored in the first battery cell in the first voltage region of battery cell output voltage and the amount of charge stored in the second battery cell in the first voltage region of battery cell output voltage; and adjusting a timing of the balancing of charge of the first or second battery cell in response to reducing the rated charge storage capacity of the first or second battery cell. The method includes where the timing of balancing is related to a voltage of the first or second battery cell. The method includes where the balancing of charge of the first or second battery cell includes decreasing battery charge. The method includes where in the first voltage region of battery output voltage, battery voltage changes in at least a first voltage amount as battery charge changes in a first charge amount, and where in the second voltage region of battery output voltage, battery voltage changes in an amount less than the first voltage amount as battery charge changes in the first charge amount. The method includes where balancing of the first battery cell is performed via passive balancing circuitry. The method includes where adjusting timing of the balancing of charge makes balancing of charge occur at a lower battery voltage during battery cell charging.

Figure 9:
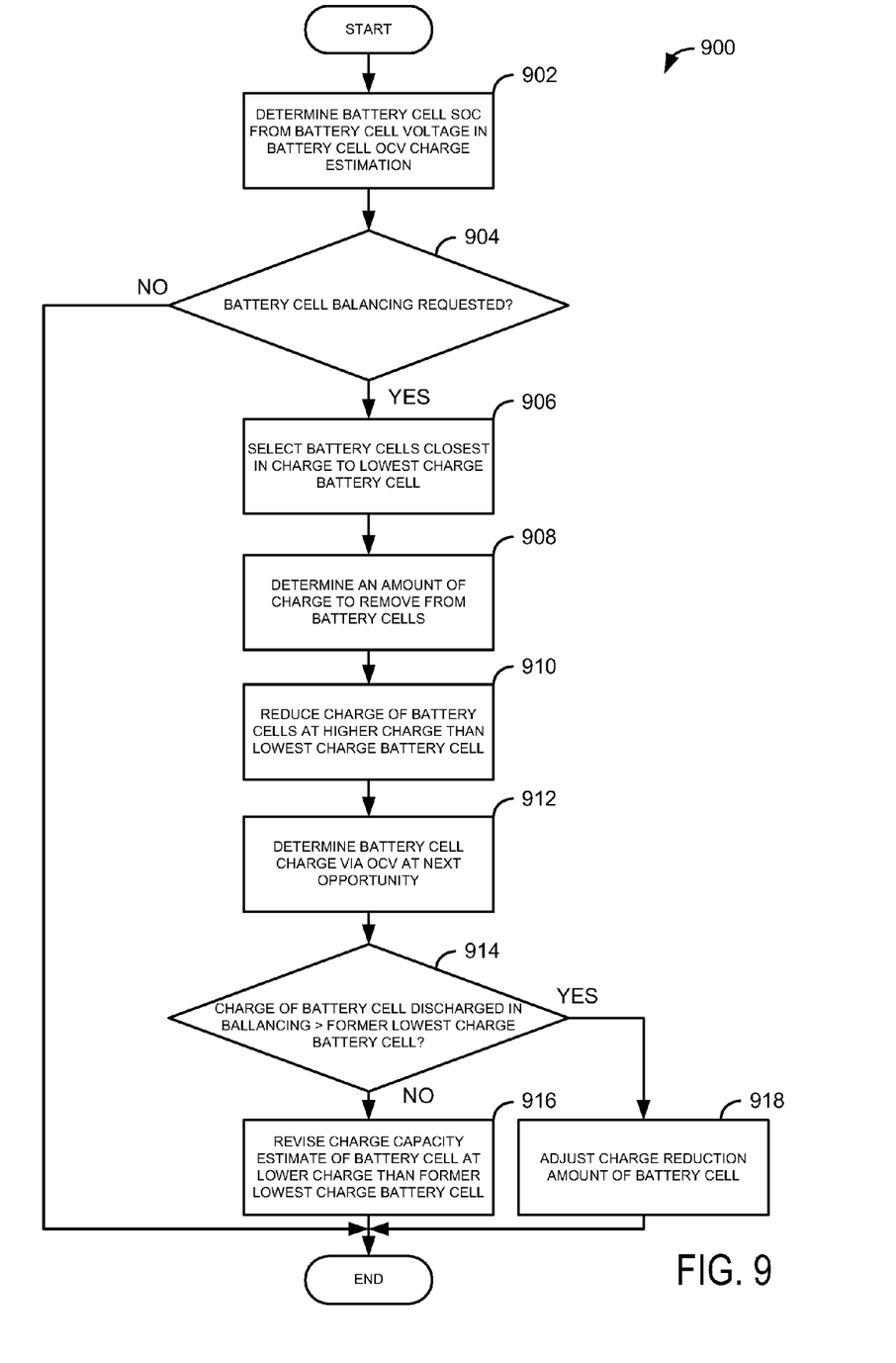
FIG. 9 shows a flowchart of a method for balancing battery cells based on a difference in charge between battery cells.

Referring now to FIG. 9, a method for balancing battery cells based on a difference in charge between battery cells. The method of FIG. 9 is executable by instructions of BCM controller 37 or MBB 35 of FIG. 1. Further, method 900 applies to systems where charge is balanced via passive devices as well as in systems where charge is shuttled between battery cells.

At 902, a SOC is determined for each battery cell of a battery cell stack or battery pack. In one example, SOC of battery cells may be determined from the method of FIGS. 7-8. In particular, the SOC of each battery cell may be determined when the battery cells are in a SOC region where the battery cell OCV changes by more than a threshold amount for a given change in SOC. In other examples, the SOC of each battery cell may be determined when the battery voltage measurement error results in a SOC estimation error of less than a threshold amount. Method 900 proceeds to 904 after the SOC of each battery cell is determined.

At 904, method 900 judges whether battery cell charge balancing has been requested. In one example, battery cell charge balancing is requested after a predetermined amount of charge has been added to or withdrawn from the battery cells of a battery cell stack or battery pack. If battery cell charge balancing is requested method 900 proceeds to 906. Otherwise, method 900 exits.

It should be noted that the battery cells may be charged or discharged between 902 and 904 during the course of operating the battery pack. In some examples, it may be desirable to balance charge of battery cells in a battery charge region where there is little change in the battery cell OCV as compared to the change in battery cell SOC.

At 906, method 900 determines the battery cell or battery cells that had the lowest charge of within the battery cell stack or battery pack during estimating battery SOC charge via battery OCV measurements. Method 900 also selects the battery cells that have charge closest to the lowest charge battery cell. For example, if it is determined that among five battery cells, one battery cell had a charge of 100 coulombs and a second battery cell had a charge of 150 coulombs while the third through fifth battery cells had a charge of 200 coulombs during SOC estimation via OCV, method 900 selects the first battery cell as the lowest charge battery cell and second battery cell as the battery cell closest in charge to the lowest charge battery cell. Method 900 proceeds to 908 after selecting the battery cell closest in charge to the lowest charge battery cell.

At 908, method 900 determines an amount of charge to discharge from battery cells undergoing charge balancing. In one example, method 900 may begin by deciding to discharge the battery cell or cells that were closest in charge to the battery cell having the lowest charge at 902 by a fraction of the difference in charge between the lowest charge battery cell and the battery cell closest in charge to the lowest charge battery cell during the SOC estimation process. For example, where one battery cell had a charge of 100 coulombs and a second battery cell had a charge of 150 coulombs while the third through fifth battery cells had a charge of 200 coulombs during SOC estimation via OCV, method may determine to discharge the second battery cell of 25 coulombs during the battery cell charge balancing process. The battery cells that had a charge of 200 coulombs may be discharge by 125 coulombs so that charge of the third through fifth battery cells are brought close to the charge of the second battery cell. In another example, the charge of the third through fifth battery cells may be drained by 25 coulombs plus a fraction of the difference in charge between the second battery cell and the third through fifth battery cells. For example, the third through fifth battery cells may be discharged by 25 coulombs plus 50 coulombs for a total of 75 coulombs during the charge balancing process. Thus, the third through fifth battery cells are drained of 25 coulombs plus 50% of the difference in charge between the second battery cell and the third through fifth battery cells. In this way, the amount of charge drained from the battery cells having a higher charge during the OCV charge estimation process may be limited to a conservative amount. Consequently, there may be less possibility that the charge of battery cells being drained of charge during the balancing process falls below the charge of the lowest capacity battery cell.

In an alternative example, the charge of lower capacity battery cells may be increased to the level of the highest capacity battery cells in a similar manner so that the possibility of charging battery cells to a level greater than the highest capacity battery cell is reduced. Method 900 proceeds to 910 after determining the amount of charge to drain from each battery cell during the charge balancing process.

At 910, method 900 reduces the charge of battery cells that are at a higher charge than the lowest charge battery cell. The charge of higher charge battery cells may be drained via a resistor or a charge storage device such as a coil. For example, a resistor may be connected in parallel with a battery cell for a predetermined amount of time to drain a specified amount of charge from the battery cell. Each battery cell of a battery cell stack or battery pack that requires discharge may be drained of an individually specified amount of charge.

In an alternative example, charge of lower charge battery cells may be increased via a charging device. For example, a charge stored in a coil may be transferred to a lower charge battery cell to increase the amount of charge stored in the battery cell. Method 900 proceeds to 912 after the charge of battery cells is adjusted.

At 912, method 900 determines the battery cell SOC via OCV at the next opportunity where SOC accuracy is higher than a predetermined amount. In one example, SOC is determined as described in FIGS. 7-8. Method 900 proceeds to 914 after battery cell SOC is determined.

At 914, method 900 judges whether or not the charge of a battery cell discharged during charge balancing is greater than the charge of the lowest charge battery cell determined during the OCV SOC estimation process. If so, method 900 proceeds to 918. Otherwise, method 900 proceeds to 916.

Thus, method 900 evaluates the state of charge of the battery cells to determine if the amount of charge discharged from the battery cells brings the battery cells in balance with the lowest charge battery cell. In an alternative example, method 900 may judge whether or not charge of a battery cell charged during charge balancing is greater than the highest charge battery cell. If so, method 900 revises the charge capacity of lower charge capacity battery cells. Otherwise, method 900 adjusts the amount of charge added to battery cells during the charge balancing process.

At 916, method 900 revises the charge capacity estimate of battery cells at a lower charge than the former lowest charge battery cell that was determined at 902. In one example, the charge capacity of the battery cell at a lower charge than the former lowest charge battery cell may be revised by a predetermined amount of by a fraction of the amount of charge discharged during the charge balancing process. Method 900 proceeds to exit after updating the charge capacity of battery cells.

At 918, method 900 adjusts the charge reduction amount used during charge balancing. For example, if 25 coulombs where drained from a battery cell during the balancing process, then 30 coulombs may be drained from the battery cell during the next balancing process. The amount of charge drained from each battery cell may be updated after each balancing process so that after a number of balancing sequences (e.g., iterations) all battery cells of the battery pack arrive at substantially the same charge level after charge balancing. Method 900 proceeds to exit after adjusting the charge reduction amount of each battery cell in the battery cell stack or battery pack.

As will be appreciated by one of ordinary skill in the art, the methods described in FIGS. 7-9 may be represented by instructions for a controller and may be represented by one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, functions, or methods may be repeatedly performed depending on the particular strategy being used.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for balancing charge between battery cells, comprising:
    estimating an amount of charge stored in a first battery cell in response to an open circuit voltage of the first battery cell, the open circuit voltage in a first voltage region of battery cell output voltage;
    estimating an amount of charge stored in a second battery cell in response to an open circuit voltage of the second battery cell, the open circuit voltage in the first voltage region of battery cell output voltage;
    reducing a total charge capacity of the first or second battery cell from a rated charge storage capacity in response to an open circuit voltage of the first or second battery cell and an integrated charge capacity of the first or second battery cell;
    balancing charge of the first or second battery cell in a second voltage region of battery cell output voltage in an amount of charge related to a difference between the amount of charge stored in the first battery cell in the first voltage region of battery cell output voltage and the amount of charge stored in the second battery cell in the first voltage region of battery cell output voltage, where a slope of battery voltage versus battery charge of the first voltage region is higher than a slope of battery voltage versus battery charge of the second voltage region, and where a battery voltage of the first voltage region is lower than a battery voltage of the second voltage region; and
    adjusting a timing of the balancing of charge of the first or second battery cell in response to reducing the rated charge storage capacity of the first or second battery cell.

2. The method of claim 1, where the timing of balancing is related to a voltage of the first or second battery cell.

3. The method of claim 1, where the balancing of charge of the first or second battery cell includes decreasing battery charge.

4. The method of claim 1, where balancing of the first battery cell is performed via passive balancing circuitry.

5. The method of claim 1, where adjusting timing of the balancing of charge makes balancing of charge occur at a lower battery voltage during battery cell charging.

6. A method for balancing charge between battery cells, comprising:
    estimating an amount of charge stored in a first battery cell in response to an open circuit voltage of the first battery cell, the open circuit voltage in a first voltage region of battery cell output voltage;

estimating an amount of charge stored in a second battery cell in response to an open circuit voltage of the second battery cell, the open circuit voltage in the first voltage region of battery cell output voltage;

reducing a total charge capacity of the first or second battery cell from a rated charge storage capacity in response to an open circuit voltage of the first or second battery cell and an integrated charge capacity of the first or second battery cell;

balancing charge of the first or second battery cell in a second voltage region of battery cell output voltage in an amount of charge related to a difference between the amount of charge stored in the first battery cell in the first voltage region of battery cell output voltage and the amount of charge stored in the second battery cell in the first voltage region of battery cell output voltage; and adjusting a timing of the balancing of charge of the first or second battery cell in response to reducing the rated charge storage capacity of the first or second battery cell, where in the first voltage region of battery cell output voltage, battery voltage changes in at least a first voltage amount as battery charge changes in a first charge amount, and where in the second voltage region of battery cell output voltage, battery voltage changes in an amount less than the first voltage amount as battery charge changes in the first charge amount.

7. The method of claim 6, where the timing of balancing is related to a voltage of the first or second battery cell.

8. The method of claim 6, where the balancing of charge of the first or second battery cell includes decreasing battery charge.

9. The method of claim 6, where balancing of the first battery cell is performed via passive balancing circuitry.

10. The method of claim 6, where adjusting timing of the balancing of charge makes balancing of charge occur at a lower battery voltage during battery cell charging.

* * * * *